US011514160B2

(12) United States Patent
Prokudin et al.

(10) Patent No.: US 11,514,160 B2
(45) Date of Patent: *Nov. 29, 2022

(54) SYSTEM AND METHOD FOR DETERMINING A COEFFICIENT OF HARMFULLNESS OF A FILE USING A TRAINED LEARNING MODEL

(71) Applicant: AO Kaspersky Lab, Moscow (RU)

(72) Inventors: Sergey V. Prokudin, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 74 days.

This patent is subject to a terminal disclaimer.

(21) Appl. No.: 17/158,067

(22) Filed: Jan. 26, 2021

(65) Prior Publication Data

US 2021/0150030 A1 May 20, 2021

Related U.S. Application Data

(63) Continuation of application No. 16/185,270, filed on Nov. 9, 2018, now Pat. No. 10,929,533.

(30) Foreign Application Priority Data

Jun. 29, 2018 (RU) .............................. 2018123695

(51) Int. Cl.
G06F 21/56 (2013.01)
H04L 9/40 (2022.01)
G06N 3/08 (2006.01)

(52) U.S. Cl.
CPC .......... *G06F 21/562* (2013.01); *G06F 21/567* (2013.01); *G06N 3/08* (2013.01);
(Continued)

(58) Field of Classification Search
CPC ...... G06F 21/56; G06F 21/562; G06F 21/567; G06F 2221/034; H04L 63/14; H04L 9/40; G06N 3/08
See application file for complete search history.

(56) References Cited

U.S. PATENT DOCUMENTS 5,675,711 A 10/1997 Kephart et al.
9,959,407 B1 5/2018 Li et al.
(Continued)

FOREIGN PATENT DOCUMENTS

JP 2016206950 A 12/2016
JP 2017037555 A 2/2017

OTHER PUBLICATIONS

Anonymous: "Training, test, and validation sets—Wikipedia", Nov. 29, 2016 (Nov. 29, 2016) Retrieved from the Internet: URL:https://en.wikipedia.org/w/index.php?title=Training,_test,_and_validation sets&o ldid=752127502 [retrieved on Mar. 9, 2018].

*Primary Examiner* — Jayesh M Jhaveri
(74) *Attorney, Agent, or Firm* — ArentFox Schiff LLP; Michael Fainberg

(57) ABSTRACT

Disclosed herein are systems and methods for determining a coefficient of harmfulness of a file using a trained learning model. In one aspect, an exemplary method includes forming a first vector containing a plurality of attributes of a known malicious file. A learning model is trained using the first vector to identify a plurality of significant attributes that influence identification of the malicious file. A second vector is formed containing a plurality of attributes of known safe files. The learning model is trained using the second vector to identify attributes insignificant to the identification of the malicious file. An unknown file is analyzed by the learning model. The learning model outputs a numerical value iden- (Continued)

tifying a coefficient of harmfulness relating to a probability that the unknown file will prove to be harmful.

17 Claims, 4 Drawing Sheets

(52) U.S. Cl.
CPC ........ *G06F 21/56* (2013.01); *G06F 2221/034* (2013.01); *H04L 63/14* (2013.01)

(56) References Cited

U.S. PATENT DOCUMENTS

| | | | |
|---|---|---|---|
| 10,157,279 B2* | 12/2018 | Davis | G06F 21/565 |
| 10,225,277 B1* | 3/2019 | Shintre | G06F 21/6254 |
| 2014/0090061 A1* | 3/2014 | Avasarala | G06F 21/566 |
| | | | 726/24 |
| 2015/0379264 A1* | 12/2015 | Aime | G06F 21/565 |
| | | | 726/23 |
| 2017/0068816 A1 | 3/2017 | Cavazos | |
| 2019/0018960 A1* | 1/2019 | Chistyakov | G06N 20/00 |
| 2019/0087744 A1* | 3/2019 | Schiemenz | G06N 20/00 |
| 2019/0132334 A1* | 5/2019 | Johns | H04L 63/145 |
| 2021/0150030 A1* | 5/2021 | Prokudin | G06F 21/562 |

* cited by examiner

SYSTEM AND METHOD FOR DETERMINING A COEFFICIENT OF HARMFULLNESS OF A FILE USING A TRAINED LEARNING MODEL

CROSS REFERENCE TO RELATED APPLICATIONS

This application is a continuation of prior U.S. patent application Ser. No. 16/185,270, filed Nov. 9, 2018, which claims benefit of priority under 35 U.S.C. 119(a)-(d) to a Russian Application No. 2018123695, filed Jun. 29, 2018, the entire contents of each of which are incorporated herein by reference.

FIELD OF TECHNOLOGY

The disclosure relates to solutions for identifying malicious files, more particularly, to systems and methods of detecting malicious files using a learning model trained on a malicious file.

BACKGROUND

At present, the volume of malicious software is increasing (such as computer viruses, Trojan horses, Internet worms), designed to cause harm to a user's data and to the actual user of an electronic device infected with malicious software. The harm may be caused by damaging or removing user files, utilizing the resources of a computing device of a user for "mining" of crypto currencies, stealing confidential user data (correspondence, images, logins, passwords, bank card data) and other actions. Furthermore, malicious software is constantly changing, since their creators resort to new methods of attack and defense against security applications. Different mechanisms that are used include, for example, obfuscation of malicious code (in other words, placing the original text or executable code of a program in a form which preserves its functionality, yet impairs the analysis, understanding of the operating algorithms, and modification during decompiling, for instance) or the use of emulation counteracting measures (for example, the malicious software is endowed with functions of recognizing when it is being executed in an emulator, and does not manifest its malicious activity).

Furthermore, malicious software often does not manifest its malicious activity immediately, or all at one time, but instead performs a multitude (in the order of millions of calls) of API calls and enormous cycles (in the order of billions of iterations), and halts its running for a certain time immediately after being launched (for example, for one hour, using the function "Sleep( )"). The computing devices of users at present have high performance, making use of multiple-core processors (or even multiprocessor systems), and therefore the user might not notice or pay attention to the workload of one of the cores. Furthermore, a user generally uses the device for longer than one hour from when the user turned, activated or started the device. Therefore the malicious software, once launched, has no need to immediately manifest its activity.

There are also attacks referred to as "targeted" attacks (advanced persistent threat, APT). These attacks are carried out on organizations and companies as a whole, being realized against the infrastructure by exploiting software vulnerabilities and methods of "social engineering". There are known instances where such attacks were conducted with the use of several simple applications that did not manifest any malicious activity individually, yet upon penetrating the infrastructure of the company being attacked the simple applications executed jointly, forming a malicious functionality together and causing harm to the company being attacked.

In order to combat the mentioned techniques, the creators of security applications (such as antivirus applications) use techniques with the use of virtual machines in the form of an isolated environment for the safe execution of files. Such virtual machines are often referred to as "sandboxes". The hypervisors control the execution of the virtual machines and often contain mechanisms for intercepting the functions called by the applications being executed in the virtual machines.

It should be noted that security applications employ various methods for identifying malicious software, for example technologies such as signature and/or heuristic analysis. If the harmfulness of a file has not been determined in the course of analysis, it may be sent by the security application for analysis of its behavior to the mentioned virtual machine (for example, if it does not have a digital signature from a trusted software manufacturer). The sent file is then executed in the virtual machine where the actions of the application and the events occurring as a result of various function calls in the application are intercepted, the information about the intercepted events and actions is stored in a log, and afterwards the security application or an expert in computer security analyzes this in order to identify malicious software.

Furthermore, methods are known which employ neural nets to identify malicious software. However, the known methods of identifying malicious software cannot effectively solve the problem of an identification when all that is known is a single file (a single file sample) identified as being malicious and which is rarely altered by criminals. Oftentimes (for example, in the case of an APT attack) such a file might be signed by a trusted certificate and perform actions which cannot be considered as being uniquely malicious. For example, opening a .DOC file, closing it without change, sending a data packet or an email. The mentioned actions are perfectly safe from the standpoint of the security application (there are many programs which are able to open text files and send messages and/or emails), yet as a result of their execution the theft of confidential data is possible from the mentioned opened file. It is desirable to identify, on the basis of such a single file, other malicious files which are similar in functionality to the mentioned single file. Furthermore, it is necessary to identify, from indirect attributes of the file in the case of the above-described APT attack, other files being used for the attack.

The present disclosure makes it possible to solve such problems of identifying malicious files with the use of a learning model trained on one malicious file.

SUMMARY

Aspects of the disclosure relate to the field of identifying malicious files, and more specifically to determining a coefficient of harmfulness of a file using a trained learning model. In one aspect, an exemplary method includes forming a first vector containing a plurality of attributes of a known malicious file. A learning model is trained using the first vector to identify a plurality of significant attributes that influence identification of the malicious file. A second vector is formed containing a plurality of attributes of known safe files. The learning model is trained using the second vector to identify attributes insignificant to the identification of the malicious file. An unknown file is analyzed by the learning model. The learning model outputs a numerical value identifying a coefficient of harmfulness relating to a probability that the unknown file will prove to be harmful.

In another aspect, the attributes insignificant to the detection of a malicious file are those attributes that expend computing resources without improving the identification of the coefficient of harmfulness.

In another aspect of the method, the learning model comprises a neural network.

In another aspect of the method, outputting the numerical value further comprises generating a vector of resulting attributes having a dimensionality of one.

In another aspect, the method further comprises generating rules for detection of malicious files from the learning model, and wherein the rules of detection contain at least one condition of detection associated with the coefficient of harmfulness.

In another aspect, the method further comprises selecting a loss function for the neural network based on a method of the loss function error gradient prior to training the neural network.

In another aspect of the method, analyzing the unknown file comprises applying the generated rules of detection to the analyzed unknown file and identifying the analyzed unknown file as malicious if the at least one condition of detection is fulfilled based on the resulting attributes of the analyzed unknown file.

In another aspect, the method further comprises selecting and modifying parameters of the neural network prior to training the neural network.

According to one aspect of the disclosure, a system is provided for determining a coefficient of harmfulness of a file using a trained learning model. The system includes a hardware processor configured to form a first vector containing a plurality of attributes of a known malicious file. A learning model is trained using the first vector to identify a plurality of significant attributes that influence identification of the malicious file. A second vector is formed containing a plurality of attributes of known safe files. The learning model is trained using the second vector to identify attributes insignificant to the identification of the malicious file. An unknown file is analyzed by the learning model. The learning model outputs a numerical value identifying a coefficient of harmfulness relating to a probability that the unknown file will prove to be harmful.

In one exemplary aspect, a non-transitory computer-readable medium is provided storing instructions thereon for determining a coefficient of harmfulness of a file using a trained learning model, wherein the instructions include forming a first vector containing a plurality of attributes of a known malicious file. A learning model is trained using the first vector to identify a plurality of significant attributes that influence identification of the malicious file. A second vector is formed containing a plurality of attributes of known safe files. The learning model is trained using the second vector to identify attributes insignificant to the identification of the malicious file. An unknown file is analyzed by the learning model. The learning model outputs a numerical value identifying a coefficient of harmfulness relating to a probability that the unknown file will prove to be harmful.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for determining a coefficient of harmfulness of a file using a trained learning model. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In the present disclosure, elements of the system are understood to be actual devices, systems, components, groups of components realized with the use of hardware, such as integrated microcircuits (application-specific integrated circuit, ASIC) or programmable gate arrays (field-programmable gate array, FPGA) or, for example, in the form of a combination of software and hardware, such as a microprocessor system and a set of software instructions, as well as neuromorphic chips (neurosynaptic chips). The functionality of these elements of the system can be realized exclusively by hardware, and also in the form of a combination, where some of the functionality of the elements of the system is realized by software, and some by hardware. In some exemplary aspects, some or all of the elements may be implemented on the processor of a general-purpose computer (such as the one shown in FIG. 4). The components (each of the elements) of the system may be realized within a single computing device or spread out among several interconnected computing devices.

Figure 1:
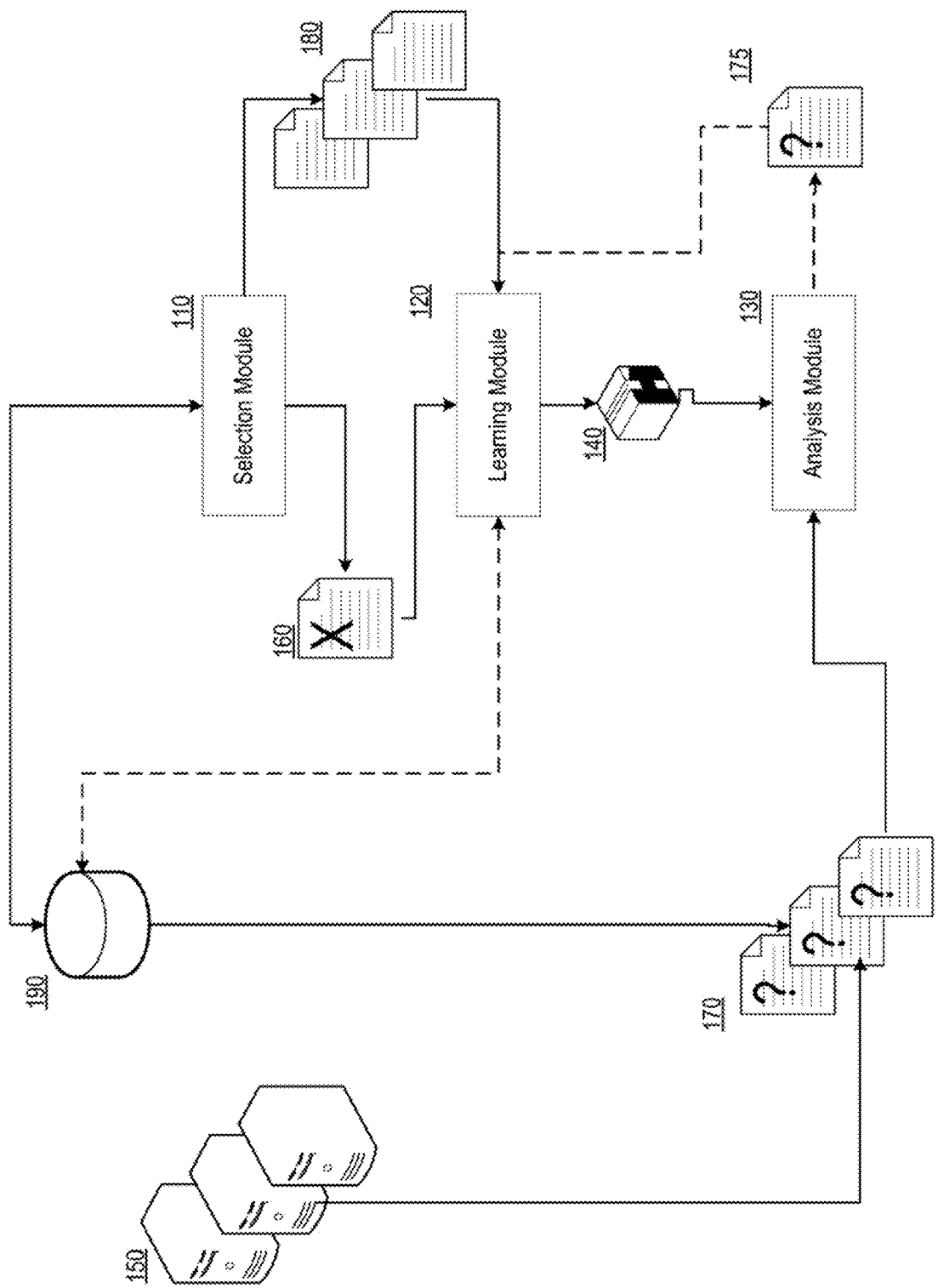
FIG. 1 is a block diagram illustrating a system of identifying malicious files using a learning model trained on a malicious file.

FIG. 1 is a block diagram illustrating a system of identifying malicious files using a learning model trained on a malicious file.

The system 100 for identifying malicious files on the basis of one file consists of a selection module 110, a learning module 120, and an analysis module 130.

In the general case, the selection module 110 is executed on a remote server or in the form of a cloud service. The selection module 110 selects one malicious file 160 from a collection of malicious files. The selected file in the general case is a sample based on which other files may be recognized as malicious thanks to the working of the present system. The collection of malicious files is a group of files previously recognized as being malicious. In one exemplary aspect, the mentioned files are recognized as being malicious by the analysis module 130. In another exemplary aspect, the mentioned files are recognized as being malicious by an expert in computer security. Their harmfulness in the general case can be identified by methods known from the prior art (such as heuristic or signature analysis). In one exemplary aspect, the selection module 110 selects not a malicious file as a whole, but rather its separate parts, one or more. For example, the parts of the file are selected which contain only executable or text code (in the case of a script file); the parts not containing resources (images, strings); or the parts not containing obfuscated code added by the criminals.

Moreover, the selection module 110 selects at least two files from a collection of safe files. Safe files are files not recognized as being malicious (by an expert in computer security or by the analysis module 130). In one exemplary aspect, the entire collection may be selected. In another exemplary aspect, files may be selected by various separate criteria and combinations of criteria for both the selected malicious file and the safe files. For example, safe text script files are selected (of the same type as the selected malicious file) whose prevalence on the computers of users is more than 10000 copies, while the size of the files is less than 4 kilobytes. In one exemplary aspect, the selection module 110 does not select a safe file as a whole, but rather its parts, analogously with what was mentioned above.

In the general case, the collections of malicious and safe files are stored in a database 190.

In one exemplary aspect, the result of the selecting of files (malicious file and safe files) may be the identifiers of these files in the collections.

In the general case, the selected files, or their parts, or their identifiers, are sent by the selection module 110 to the learning module 120.

The learning module 120 generates (creates) on the basis of machine learning methods a learning model utilizing a neural net (hereinafter, a trained neural net). In the general case, various machine learning methods are used including Gradient-based decision-tree-based gradient boosting (decision-tree-based gradient boosting), deciding trees (English decision trees), Nearest neighbor method kNN (English K-nearest neighbor method), method support vectors (English support vector machine, SVM). The learning module 120 selects at least the following parameters of the neural net: the number of layers, the number of neurons in the layers, and the loss function (e.g. loss function associated with classification). In a particular exemplary aspect, the learning module 120 additionally selects the coupling coefficients between neurons (weights) and the coefficients of the loss function.

In a particular aspect, the method of error back propagation is used. This method of machine learning is an iteration gradient algorithm characterized by minimizing the error of functioning of a multilayered neural net.

Figure 2:
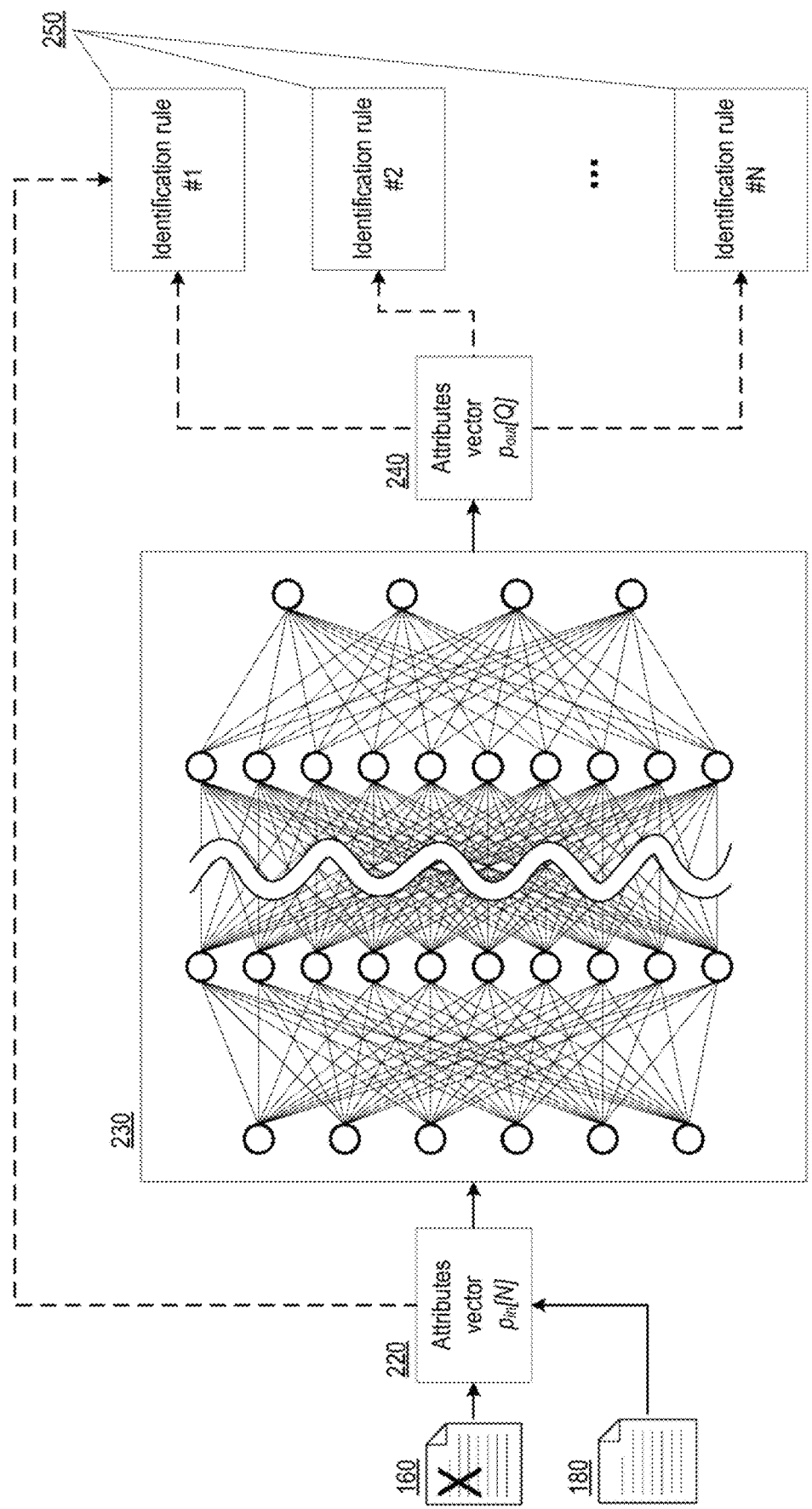
FIG. 2 is a flow diagram illustrating a method of identifying vulnerabilities by using an interception of function calls.

The general case of the working of the learning module 120 is presented in FIG. 2.

The learning module 120 forms the vector $p_{in}[N]$ 220, containing N attributes picked out from a malicious file 160 or its parts. The attributes of the malicious file 160 in one exemplary aspect are picked out from the meta-data of the malicious file 160 (for example, the size, the time of creation and/or modification, attributes, access rights). In another exemplary aspect, the attributes are picked out on the basis of the data of the malicious file 160, performing an analysis of the content of the malicious file 160. For example, the presence of a certificate, a sequence of bytes, or the calling of a particular function in the code.

The result of the working of the trained neural net 140 in the general case is a generated vector of resulting attributes $p_{out}[Q]$ 240, containing Q resulting attributes. In one aspect, the Q resulting attributes are the most important data characterizing the data that is classified by the neural network 140. The result of the operation of a neural network is, in general, a selection from the variety of attributes (for example, a file) of the most significant attributes (for example, to introduce malware of the file).

In a particular aspect, for the solving of the problem of identifying a malicious file the vector of resulting attributes $p_{out}[1]$ 240 has a dimensionality of 1 and contains a numerical value—the coefficient of harmfulness. The coefficient of harmfulness characterizes the probability that the file will prove to be harmful (for example, from 0 to 1); the higher the coefficient of harmfulness, the higher this probability.

The problem of determining the coefficient of harmfulness of a file with the use of a trained neural net 140 comes down to solving a system of equations with K unknowns, which can be represented mathematically as a matrix multiplication $M_{K \times K}$. The neural net 230 contains at least 3 layers (two outer and one hidden layer). On the first (incoming) outer layer the attribute vector of the malicious file $p_{in}$ 220 is transformed (developed) into the matrix of the neural net layer $M_{in}$. On the last (outgoing) outer layer, the neural net matrix $M_{out}$ is mapped into the vector of resulting attributes $p_{out}$ 240, defined as follows.

$$p_{out} = p_{in} \times M_{in} \times \prod_i M_i \times M_{out}$$

where:

$\times M_{in}$—is the mapping of the vector into the first outer layer;

$\times \prod_i M_i \times$—is the mapping of the first layer into the outer inner layer and from the inner layer into the last layer;

$\times M_{out}$—is the mapping of the last outer layer into the vector;

$\prod_i M_i$—is the mapping of the inner layers from first to last, with the abstraction being true:

$$\prod_i M_i = M_{inside}$$

that is, when using the trained model there is one inner layer, but when training that model the inner layer may constitute a set of layers, each of which is characterized by its own matrix $M_i$, the elements (coefficients) of which may be corrected.

The problem of training the neural net 230 in the general case comes down to determining the quantitative contribution of each of the attributes of the malicious file 160 to the formation of the vector of resulting attributes $p_{out}$ 240, from the results of which there is also additionally determined in a particular aspect:

the threshold value of the contribution of each $\zeta_i$ attribute from the set of attributes $\{\zeta_i\}$ of the malicious file $p_{in}$ to the vector of resulting attributes $p_{out}$, below which value it is considered that the i-th attribute $\zeta_i$ of the malicious file has minimal influence on the vector of resulting attributes $p_{out}$ and may be eliminated during the further analysis of the file from the vector of attributes of the malicious file $p_{in}$ being used by the neural net;

the range of values of the resulting attributes, detection in which means that the file is malicious $\min(p_{out})$ > $p_{out}$ > $\max(p_{out})$, $$p_{out}(\zeta_i) = f(p_{in}(\{\zeta_i\}))$$

where $\{\zeta_i\}$ is the set of file attributes on the basis of which the vector is formed.

More specifically:

In the process of training, M attributes of malicious files are determined out of the singled-out N attributes of the malicious file 160. These N attributes have significant influence on the result of the identification of the malicious file 160 (significant attributes of the malicious file 160).

The other O=M−N attributes of malicious files 160 are considered to be insignificant attributes, whose influence on the identification of the malicious file 160 is minimal. The use of the O attributes, to a significant degree, only expends computing resources without significant improvement in the result, and thus the O attributes are eliminated from further analysis. Determining whether there is a significant improvement in the result comprises a statistical determination, for example: If some coefficient is calculated (usually in the mathematical sense—the coefficients of the approximation of one function of another or the approximation of the data of some functions, etc., that can be estimated by some coefficient of efficiency/approximation coefficient, etc. (see the coefficient of determination)), the coefficient characterizing the efficiency of our process from 0 (inefficient) to 1 (effective) and when one or more parameters change, the coefficient characterizing efficiency changes insignificantly (for example by 1%), then the parameter is not used, because it is not rational. For example, for a function y=x^a+b, the influence of the linear parameter b on y is practically negligible, but the effect of the power parameter a is very large and therefore considered significant because the impact on the value of y as x changes exceeds a predetermined threshold.

In the beginning, it is assumed that M=N, and all the attributes arrive at the incoming layer of the neural net 230. The incoming layer transforms the vector of attributes $p_{in}$ into the matrix $M_{N \times N}$.

The hidden layers (in a particular aspect, a single inner layer is sufficient, while in the general case the number of hidden layers is unlimited) that depend on the loss function reveal the regularities and relations of the neurons for detecting the malicious file.

The outgoing layer generates the result of the working of the neural net 230, the result constituting the vector of resulting attributes $p_{out}$. In a particular aspect, the outgoing layer generates the aforementioned coefficient of harmfulness.

In one exemplary aspect, the learning module 120 selects a loss function, for example on the basis of the method of the loss function error gradient. The training of the neural net 230 is performed after selecting the loss function.

From each selected safe file 180 or its parts, the learning module 120 also singles out a vector of N attributes 220 and sends them to the initial incoming layer of the neural net being trained.

As a result of the training, the attributes O, insignificant to the identification of the malicious file 160, are singled out. The number of significant attributes M becomes less than N (M<N), which decreases the size of the matrices [M, M] and decreases the time for computations in the neural net 230.

In this process, a safe file 180 should not be identified as malicious (for example, the coefficient of harmfulness for a safe file should not exceed the threshold value). However, if a safe file 180 is identified as malicious, or in other words, a false alarm occurs, the learning module 120 selects another loss function and a retraining is done for the neural net 230.

As a result of the above-described actions, the learning module 120 generates a trained (in one exemplary aspect, a retrained) neural net 140. In the general case, the trained neural net 140 has a compact description as compared to an untrained one (the matrix [M, M] is smaller than the matrix [N, N]), and it contains only the regularities and relations of the neurons for detecting malicious software (e.g., the malicious file 160 selected by the selection module 110).

In one exemplary aspect, the learning module 120 generates rules for detection 250 of the malicious file 160 on the basis of the vector of resulting attributes 240. In one aspect, the rule for detection 250 contains at least one condition of detection. As was previously mentioned, the vector of resulting attributes 240 may have a dimensionality of [1]. In the general case, the rule for detection 250 (even for a unidimensional vector of resulting attributes 240) may contain several conditions of detection. For example, if the coefficient of harmfulness is greater than 0.9, the file should be considered malicious. But if the coefficient of harmfulness is greater than 0.6, yet less than 0.9, a further verification should be done. In yet another exemplary aspect, the rule of detection 250 additionally uses at least one of the attributes contained in the vector of attributes 220. For example, if the file type is "executable" and the coefficient of harmfulness is greater than 0.8, the file should be considered malicious. If the coefficient of harmfulness is less than 0.5 and the file type is "text" (such as a script file), such a file should be considered safe. Thus, as a result of the training of the neural net 230, the learning module 120 generates a trained neural net 140 and rules for detection 250.

In a particular exemplary aspect, the trained neural nets 140 and rules for detection 250 may be saved by the learning module 120 in a database 190.

In the general case, the learning module 120 sends the trained neural net 140 and the rules for detection 250 to the analysis module 130.

The analysis module 130 in the general case is implemented on the computing devices of the users 150. In a particular exemplary aspect, the analysis module 130 is implemented on a server. The analysis module 130 scans unknown files 170 for harmfulness with the use of the trained neural net 140 and the rules of detection 250. In the general case, if as a result of the generating by the analysis module 130 of the vector of resulting attributes 240 of an unknown file 170 the conditions for detection of a malicious file are fulfilled, as contained in the rule for detection 250, the unknown file 170 is recognized as malicious. In one exemplary aspect, the analysis module 130 additionally scans an unknown file 170 for harmfulness with the use of methods known from the prior art.

In the event that the unknown file 170 is recognized as malicious with the use of the trained neural net 140 and the rules for detection 250, and with the use of methods known from the prior art the unknown file 170 is safe (for example, it has a digital certificate issued by a trusted certification center, or it is on a white list, or has been recognized as safe with the involvement of an expert in computer security), a false alarm of the trained neural net 140 and the rules for detection 250 is identified. In this case, the file for which the false alarm 175 was identified is added by the analysis module 130 to the selection of safe files 180 chosen by the selection module 110. After this, the analysis module 130 initiates the process of selecting the loss function and retraining the neural net 230 by the learning module 120, taking into account the file added to the selection of safe files for which the false alarm 175 was identified.

In one exemplary aspect, the analysis module 130 additionally performs a scanning of other malicious files 180. In the event that, with the use of the trained neural net 140 and the rules for detection, the analysis module 130 identifies another malicious file as malicious, the neural net trained for the detection of the other malicious file may be excluded from the set of trained neural nets 140 for the identification of malicious files.

Figure 3:
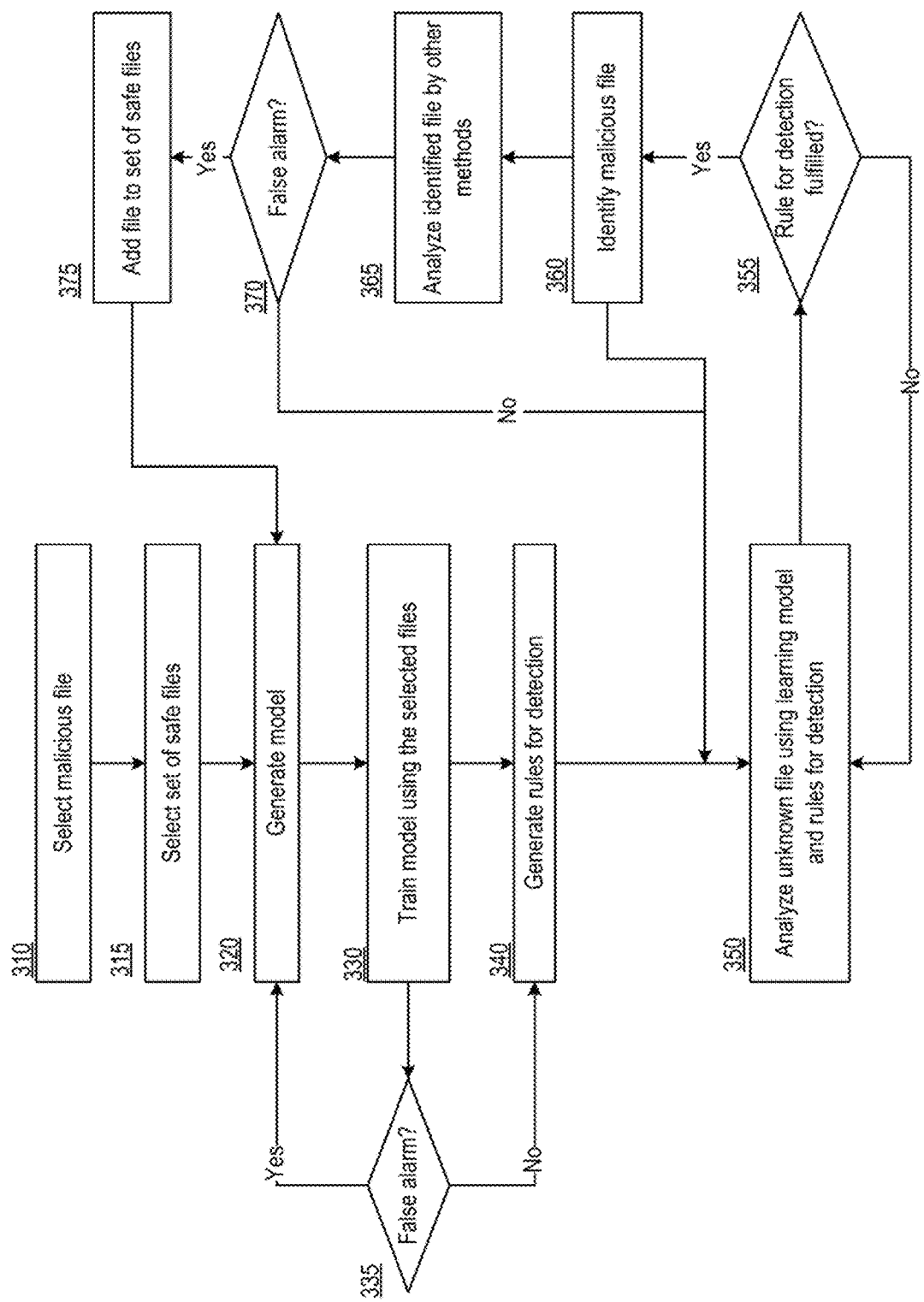
FIG. 3 is a flow diagram illustrating the structure of a method of identifying malicious files using a learning model trained on a malicious file.

FIG. 3 is a flow diagram illustrating the structure of a method of identifying malicious files using a learning model trained on a malicious file.

According to one aspect, in step 310 the selection module 110 may be configured to select one malicious file (sample) from the collection of malicious files. In this aspect, the collection of malicious files is a set of files whose harmfulness was previously identified. In another exemplary aspect, the harmfulness of the file is identified by an expert in computer security. Harmfulness in the general case may be identified by methods known from the prior art (such as heuristic or signature analysis). In one exemplary aspect, the selection module 110 selects one or more separate portions of the malicious file as opposed to the whole.

In one aspect, in step 315 the selection module 110 may be configured to select at least two files from a collection of safe files. Safe files are files not identified as being malicious as a result of a scan for harmfulness. In one exemplary aspect, the entire collection of safe files may be selected. In another exemplary aspect, safe files may be selected by various separate criteria and combinations of criteria. In one exemplary aspect, the result of selecting the files (malicious file and safe files) may be the identifiers of these files in the collections. In one exemplary aspect, the selection module 110 selects one or more portions of a safe file, while in other aspects the entire safe file is selected.

In one aspect, in step 320 the learning module 120 may be configured to generate (create) a learning model utilizing a neural net. In the general case, at least the following parameters of the neural net are selected or modified: the number of layers, the number of neurons in the layers, the loss function. In a particular exemplary aspect, the coupling coefficients between neurons (weights) and the coefficients of the loss function are additionally selected.

In the general case, other methods of machine learning are used. In a particular aspect, the method of error back propagation is used. The hidden layers dependent on the loss function reveal the regularities and relations of the neurons for detecting the malicious file. In a particular aspect, the loss function is selected on the basis of the method of the loss function error gradient.

In one aspect, in step 330 the learning module 120 may be configured to train the model with the use of the selected files (the training process is shown in detail in FIG. 2) or their parts. The learning module 120 forms a vector 220 containing N attributes selected from the malicious file 160 or portions of the malicious file 160. Out of the selected N attributes of the malicious file 160, the training process determines M attributes of malicious files having significant influence on the result of the identification of the malicious file 160 (significant attributes of the malicious file 160). In the training process, for each selected safe file 180 or its parts the learning module 120 also selects a vector of N attributes 220 and sends them to the initial incoming layer of the neural net being trained. As a result of the training, attributes O are selected, where the attributes O are insignificant to the detection of the malicious files 160. The number of significant attributes M is then less than N.

In one aspect, in step 335 the learning module 120 may be configured to scan the safe files selected by the selection module 110 for harmfulness. In the event that a safe file 180 is identified as malicious (a false alarm occurs), the learning module 120 may generate (modify) a learning model using the neural net, for example, by selecting a different loss function, and returning to step 320, and carries out a retraining of the neural net 230.

In one aspect, in step 340 after training the neural net the learning module 120 may be configured to generate rules for detection 250 of the malicious file 160 on the basis of the vector of resulting attributes 240, where the rule for detection 250 contains at least one condition for identification of maliciousness (alternatively referred to as detection of maliciousness). For example, file A and file B can be malicious (i.e., belong to the same type/family, etc.), but have different degrees of damage (e.g. 0.99 and 0.65)—in the first case, the malicious application very quickly render the computer system inoperable (for example, encrypts files), and in the second, steals passwords, or the like, but does not render the system inoperable. As was mentioned previously, the vector of resulting attributes 240 may have a dimensionality of [1]. In the general case, the rule for detection 250 (even for a unidimensional vector of resulting attributes 240) may contain several conditions of detection of maliciousness. In yet another exemplary aspect, the rule of detection 250 additionally uses at least one of the attributes contained in the vector of attributes 220.

In one aspect, in step 350 the analysis module 130 may be configured to scan unknown files 170 for harmfulness, using the trained neural net 140 and the rules for detection 250.

In one aspect, in step 355, if the conditions for detection of a malicious file are fulfilled based on the resulting attributes 240 of an unknown file 170, the unknown file 170 is recognized as malicious in step 360. In this aspect, the conditions for detection are contained in the rule for detection 250.

In one exemplary aspect, in step 365 the analysis module 130 may be configured to additionally scan (analyze) an unknown file 170 for harmfulness with the use of particular methods. In the event that the unknown file 170 is recognized as malicious with the use of the trained neural net 140 and the rules for detection 250, while with the use of the particular methods the unknown file 170 is determined to be safe, then in step 370 a false alarm of the trained neural net 140 and the rules for detection 250 is identified. In this case, in step 375, the file for which the false alarm 175 was identified is added by the analysis module 130 to the selection of safe files 180 chosen by the selection module 110. After this, with the aid of the analysis module 130, the method proceeds to step 320 where the training model is generated using the neural net, and then to step 330 where the neural net 230 is retrained by the learning module 120, both taking into account the file added to the selection of safe files for which the false alarm 175 was identified.

Figure 4:
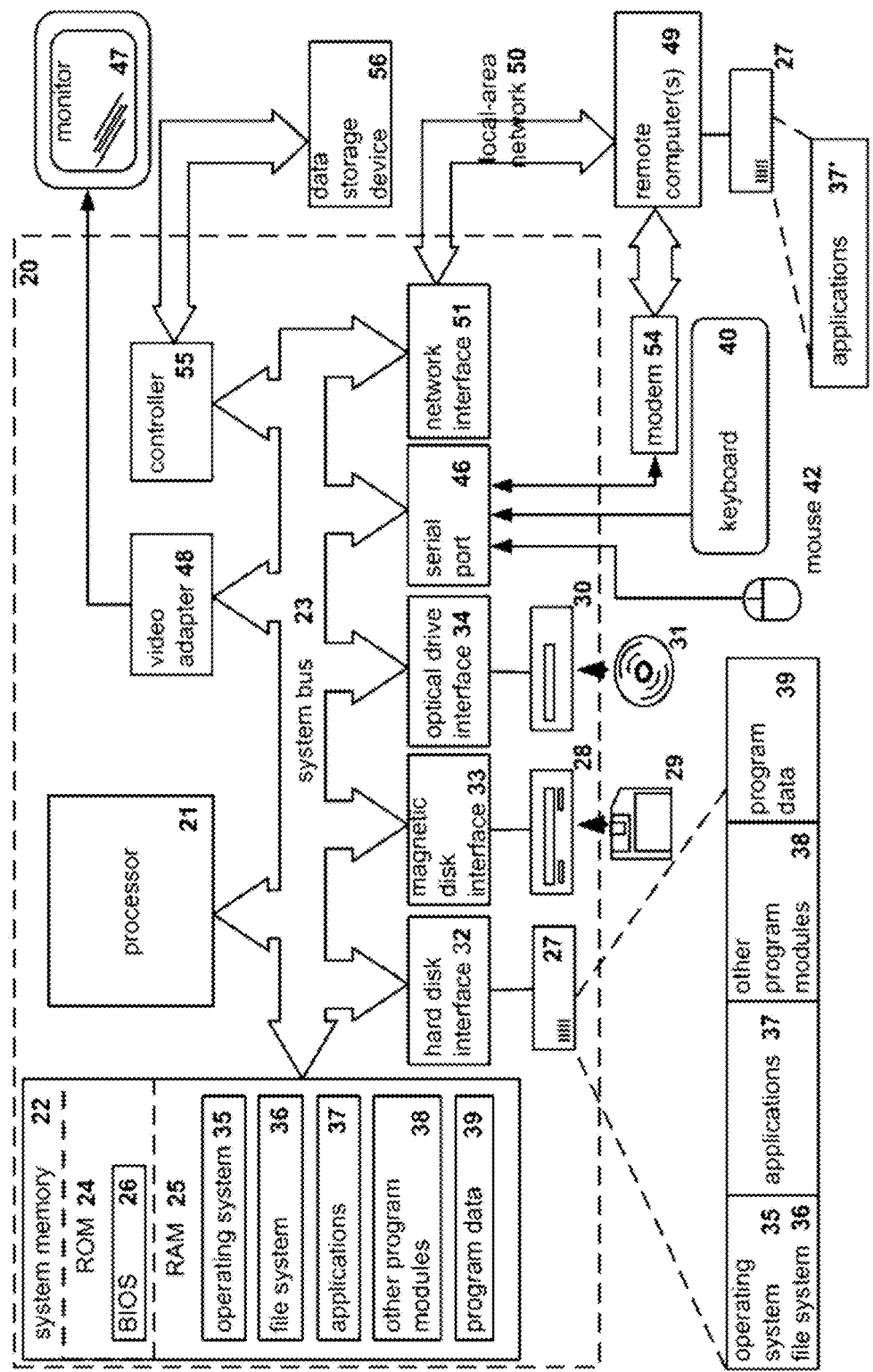
FIG. 4 presents an example of a general-purpose computer system on which aspects of the present disclosure can be implemented.

FIG. 4 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for determining a coefficient of harmfulness of a file using a trained learning model, the method comprising:
forming a first vector containing a plurality of attributes of a known malicious file;
training a learning model using the first vector to identify a plurality of significant attributes that influence identification of the malicious file;
forming a second vector containing a plurality of attributes of known safe files;
training the learning model using the second vector to identify attributes insignificant to the identification of the malicious file based on the identified plurality of significant attributes, wherein the attributes insignificant to the detection of a malicious file are those attributes that expend computing resources without improving the identification of the coefficient of harmfulness;
analyzing an unknown file by the learning model; and
outputting, by the learning model, a numerical value identifying a coefficient of harmfulness relating to a probability that the unknown file will prove to be harmful.

2. The method of claim 1, wherein the learning model comprises a neural network.

3. The method of claim 2, wherein outputting the numerical value further comprises generating a vector of resulting attributes having a dimensionality of one.

4. The method of claim 3, further comprising generating rules for detection of malicious files from the learning model, and wherein the rules of detection contain at least one condition of detection associated with the coefficient of harmfulness.

5. The method of claim 2, further comprising:
selecting a loss function for the neural network based on a method of the loss function error gradient prior to training the neural network.

6. The method of claim 5, wherein analyzing the unknown file comprises:
applying the generated rules of detection to the analyzed unknown file; and
identifying the analyzed unknown file as malicious if the at least one condition of detection is fulfilled based on the resulting attributes of the analyzed unknown file.

7. The method of claim 2, further comprising:
selecting and modifying parameters of the neural network prior to training the neural network.

8. A system for determining a coefficient of harmfulness of a file using a trained learning model, the system comprising:
a hardware processor configured to:
form a first vector containing a plurality of attributes of a known malicious file;
train a learning model using the first vector to identify a plurality of significant attributes that influence identification of the malicious file;
form a second vector containing a plurality of attributes of known safe files;
train the learning model using the second vector to identify attributes insignificant to the identification of the malicious file based on the identified plurality of significant attributes, wherein the attributes insignificant to the detection of a malicious file are those attributes that expend computing resources without improving the identification of the coefficient of harmfulness;
analyze an unknown file by the learning model; and
output, by the learning model, a numerical value identifying a coefficient of harmfulness relating to a probability that the unknown file will prove to be harmful.

9. The system of claim 8, wherein the learning model comprises a neural network.

10. The system of claim 9, wherein the hardware processor configured to output the numerical value is further configured to generate a vector of resulting attributes having a dimensionality of one.

11. The system of the claim 10, wherein the hardware processor is further configured to generate rules for detection of malicious files from the learning model, and wherein the rules of detection contain at least one condition of detection associated with the coefficient of harmfulness.

12. The system of claim 9, wherein the hardware processor is further configured to:
select a loss function for the neural network based on a method of the loss function error gradient prior to training the neural network.

13. The system of claim 11, wherein the hardware processor configured to analyze the unknown file is further configured to:
apply the generated rules of detection to the analyzed unknown file; and
identifying the analyzed unknown file as malicious if the at least one condition of detection is fulfilled based on the resulting attributes of the analyzed unknown file.

14. The system of claim 9, wherein the hardware processor is further configured to:
select and modify parameters of the neural network prior to training the neural network.

15. A non-transitory computer-readable medium, storing instructions thereon for determining a coefficient of harmfulness of a file using a trained learning model, the instructions comprising:
forming a first vector containing a plurality of attributes of a known malicious file;
training a learning model using the first vector to identify a plurality of significant attributes that influence identification of the malicious file;
forming a second vector containing a plurality of attributes of known safe files;
training the learning model using the second vector to identify attributes insignificant to the identification of the malicious file based on the identified plurality of significant attributes, wherein the attributes insignificant to the detection of a malicious file are those attributes that expend computing resources without improving the identification of the coefficient of harmfulness;

analyzing an unknown file by the learning model; and outputting, by the learning model, a numerical value identifying a coefficient of harmfulness relating to a probability that the unknown file will prove to be harmful.

16. The medium of claim 15, wherein the learning model comprises a neural network.

17. The medium of claim 16, wherein the instructions to output the numerical value further comprise instructions for generating a vector of resulting attributes having a dimensionality of one.

* * * * *